(12) United States Patent
Lim

(10) Patent No.: US 7,866,926 B2
(45) Date of Patent: Jan. 11, 2011

(54) CARGO RETENTION DEVICE

(75) Inventor: Stephen T Lim, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 814 days.

(21) Appl. No.: 11/761,644

(22) Filed: Jun. 12, 2007

(65) Prior Publication Data

US 2008/0044249 A1 Feb. 21, 2008

Related U.S. Application Data

(62) Division of application No. 11/237,351, filed on Sep. 28, 2005, now Pat. No. 7,241,092.

(51) Int. Cl.
*B60P 7/08* (2006.01)
(52) U.S. Cl. .......................... 410/94; 410/121; 410/129
(58) Field of Classification Search .................. 410/94, 410/95, 121, 129, 140–142; 296/24.4, 37.6, 296/37.8; 224/403–404, 42.33, 42.34, 42.35; 220/531
See application file for complete search history.

(56) References Cited

U.S. PATENT DOCUMENTS

| 4,875,730 | A | * | 10/1989 | Justice | |
|---|---|---|---|---|---|
| 5,167,479 | A | * | 12/1992 | Bott | 410/121 |
| 5,743,589 | A | * | 4/1998 | Felker | |
| 6,619,723 | B2 | * | 9/2003 | Duffy | |
| 7,241,092 | B2 | * | 7/2007 | Lim | 410/94 |

* cited by examiner

*Primary Examiner*—Stephen Gordon
(74) *Attorney, Agent, or Firm*—Ralph E. Smith

(57) ABSTRACT

A retainer for a vehicle cargo area that is bounded in part by a floor and a door moveable between open and closed positions includes a retaining member spanning at least a portion of the cargo area, a pivot feature operably associated with the retaining member, and a retaining feature that yieldably retains the retaining member in its second position to facilitate retaining cargo within the cargo area. The retaining member pivots about the pivot feature relative to the cargo area between a first position and a second position wherein the retaining member is inclined relative to the floor of the cargo area. When the door is open the retainer is normally in its second position to facilitate retaining cargo within the cargo area.

12 Claims, 3 Drawing Sheets

CARGO RETENTION DEVICE

CROSS-REFERENCE TO RELATED APPLICATIONS

This application is a divisional of U.S. patent application Ser. No. 11/237,351, filed Sep. 28, 2005, now U.S. Pat. No. 7,241,092, issued Jul. 10, 2007.

FIELD OF THE INVENTION

The present invention relates generally to a cargo area for a motor vehicle, and more particularly to a device for retaining cargo.

BACKGROUND OF THE INVENTION

Many vehicles include cargo areas having a relatively flat floor leading to a door, such a liftgate, tailgate or hatchback. The door typically pivots away from the flat floor to facilitate access to the cargo area. As a result of the relatively flat cargo area floor, some objects stored in the cargo area may shift during vehicle travel or otherwise come to rest against the door. Upon movement of the door away from the floor, these objects may roll, slide or otherwise fall out of the cargo area. Particularly with a hatchback or liftgate that pivots vertically away from the cargo floor, it can be difficult to prevent cargo from falling out of the vehicle upon opening the liftgate.

SUMMARY OF THE INVENTION

A retainer for a vehicle cargo area is provided that is bounded in part by a floor and a door moveable between open and closed positions includes a retaining member spanning at least a portion of the cargo area, a pivot feature operably associated with the retaining member, and a retaining feature that yieldably retains the retaining member in its second position to facilitate retaining cargo within the cargo area. The retaining member pivots about the pivot feature relative to the cargo area between a first position and a second position wherein the retaining member is inclined relative to the floor of the cargo area. When the door is open the retainer is normally in its second position to facilitate retaining cargo within the cargo area.

In one exemplary embodiment, the retaining member is displaced from its second position at least partially toward its first position when the door is closed. Under the force of the biasing member, the retaining member automatically moves towards its second position as the door is moved at least partially toward its open position. This automatically raises the retaining member to its second position upon opening of the door to facilitate retaining cargo within the cargo area. In another exemplary embodiment, the retaining member remains in its second position when the door is closed, but can be moved away from that position to facilitate loading and unloading cargo from the cargo area.

In one exemplary embodiment, the door is a liftgate that pivots upwardly and downwardly relative to the cargo area and the retaining member spans the gap between sidewalls of the cargo area and is disposed adjacent to an end of the cargo area adjacent to the door. Accordingly, upon movement of the door upwardly away from the cargo area from its closed position towards its open position, the retaining member moves to its second position wherein it is raised upwardly from the cargo area floor providing a lip or partial wall to prevent the contents of the cargo area from rolling, sliding or otherwise falling out of the cargo area before the operator of the upwardly swinging door is able to reach them. Although not necessary, the retaining member preferably pivots both inwardly toward the cargo area and outwardly away from the cargo area to facilitate loading and unloading cargo. The retaining device may also include a locking feature, which permits the retaining member to be releasably locked in a desired position, such as generally flush with the cargo floor.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF PREFERRED EMBODIMENTS

Figure 1:
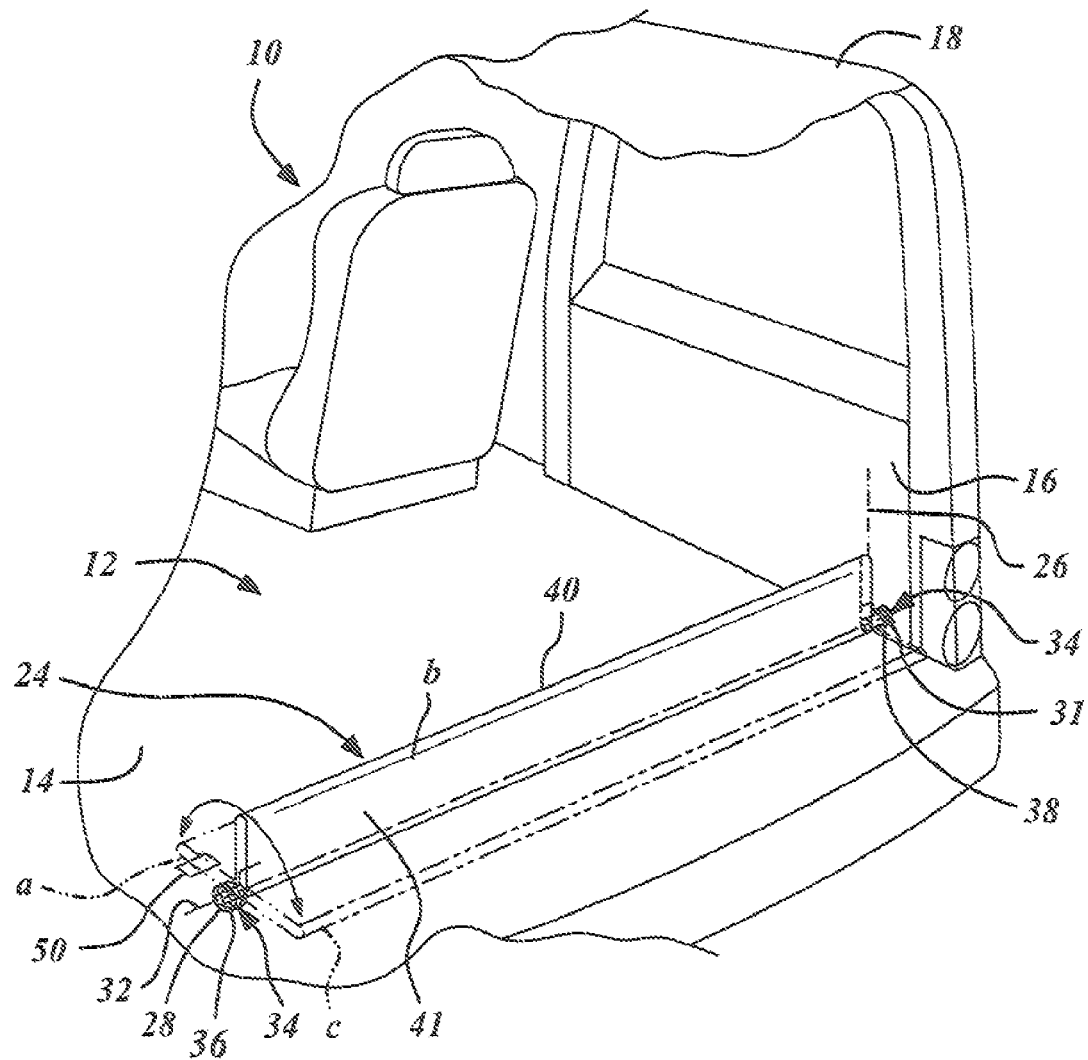
FIG. 1 is a fragmentary perspective view of a vehicle cargo area including one presently preferred embodiment of a retaining device.
Figure 2:
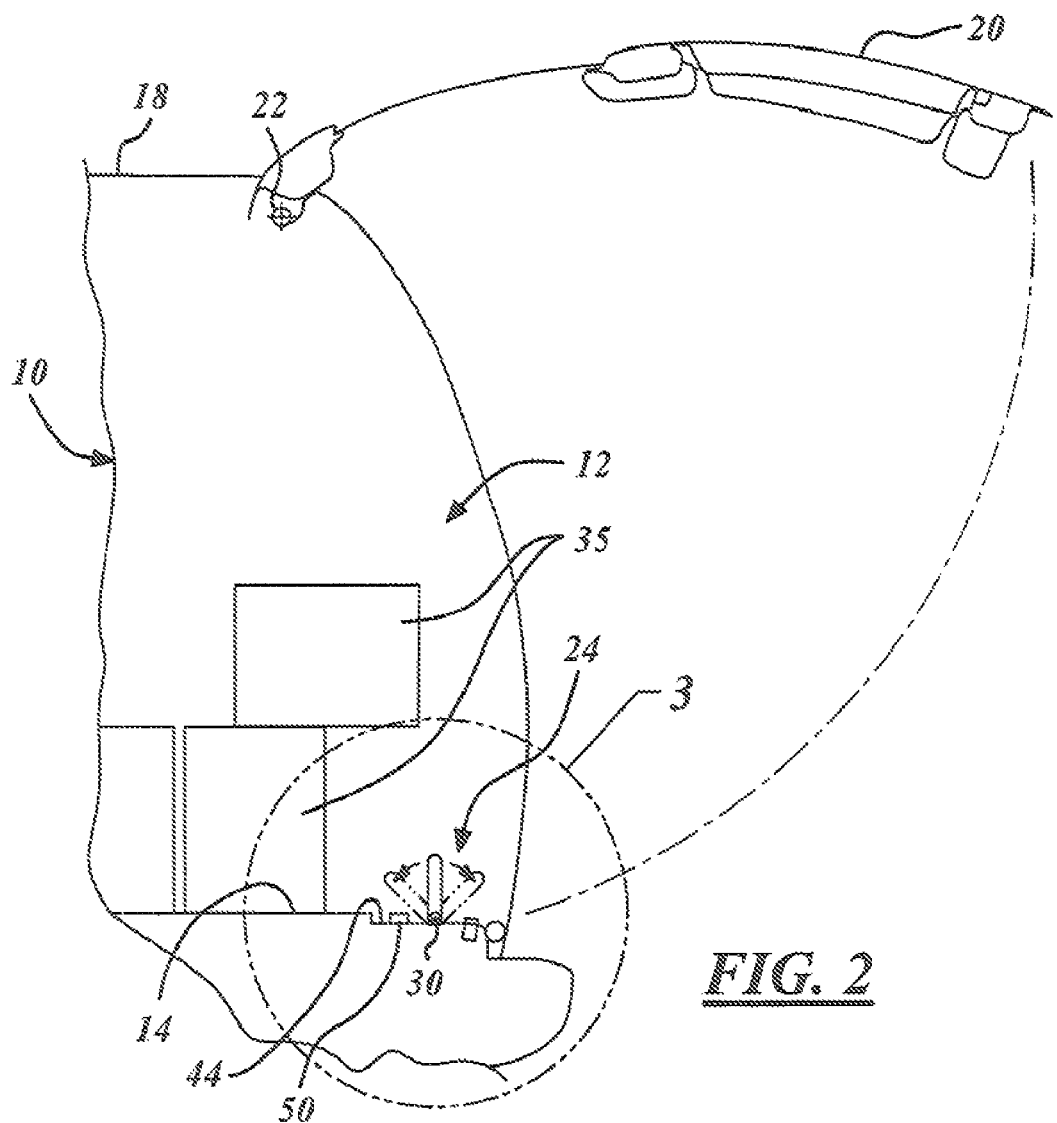
FIG. 2 is a fragmentary side view of the vehicle cargo area with a door enclosing a portion of the cargo area shown in its open position.
Figure 3:
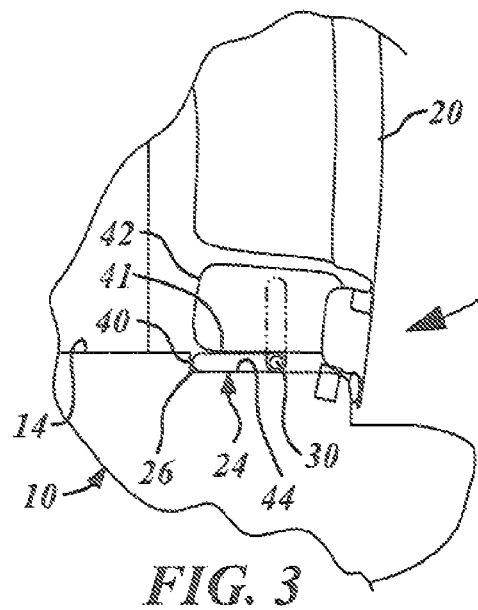
FIG. 3 is an enlarged fragmentary view of the encircled portion 3 of FIG. 2 with the vehicle door shown in its closed position.

Referring in more detail to the drawings, FIGS. 1-3 illustrate a vehicle 10 having a cargo area 12 including a floor 14, opposed sidewalls 16 (only one of which is shown) extending from the floor, usually a roof 18 and a door 20 providing access to the cargo area 12 from the exterior of the vehicle 10. In the embodiment shown the door 20 is a liftgate which pivots about a hinge 22 adjacent to the roof from a lowered, closed position to a raised, opened position, as is known in the art.

A retaining device 24 is provided in or adjacent to the cargo area 12 along an outward edge 26 of the cargo area 12 in the area of the door 20 when the door is closed. In one presently preferred embodiment, the retaining member 24 includes a generally flat panel that extends between the sidewalls 16 and is carried by the vehicle 10 generally adjacent to the floor 14. The retaining device 24 includes a pivot feature 28 which may be one or more shafts 30 that are preferably carried by the retaining member, co-axially aligned and disposed in pockets 31 in the sidewalls 16, 18 or other structure of the vehicle to permit pivoted motion or rotation of the retaining member 24 about an axis 32. The retaining member 24 is moveable from a first position 'a' that facilitates loading and unloading cargo from the cargo area, and a second position 'b' wherein the retaining member 24 is inclined at an acute included angle relative to the floor 14 to facilitate retaining cargo within the cargo area 12. In the embodiment shown, the retaining member 24 is preferably generally perpendicular to the floor 14 when in its second position 'b' to provide a raised or upstanding lip or wall that prevents objects from rolling, sliding or otherwise falling out of the vehicle from the outward edge 26 of the cargo area 12.

Figure 5:
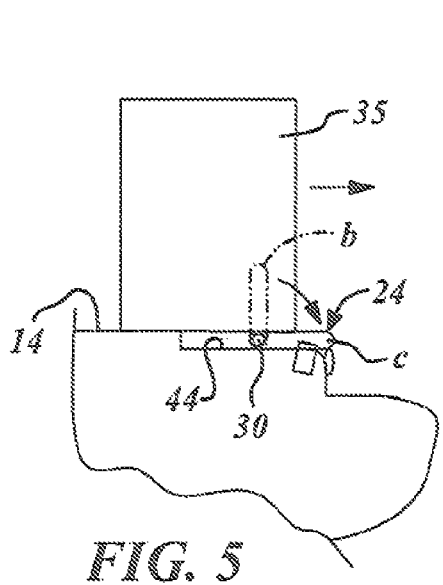
FIG. 5 is a fragmentary view illustrating a large cargo item being slidably removed from the cargo area.

As best shown in FIGS. 1 and 2, to facilitate loading and unloading cargo from the cargo area 12, the retaining member 24 may pivot from its second position 'b' both inwardly relative to the cargo area to its first position 'a' and outwardly of the cargo area to a third position 'c'. As best shown in FIG. 5, then in its third position 'c' the retaining member 24 is preferably generally flat to permit cargo 35 to be slidably removed from the cargo area 12. The retaining member 24 is shown in solid lines in its second position, and in its first and third positions is shown in phantom lines. A retaining feature preferably is provided to releasably or yieldably retain the retaining member in its second position 'b'. The retaining feature may be a biasing member 34 that yieldably biases the retaining member 24 toward its second position 'b' and away from its first position 'a'. In an embodiment wherein the retaining member 24 can also be moved to a third position 'c' (such as shown in FIGS. 1 and 2), the biasing member 34 may also yieldably bias the retaining member 24 away from its third position 'c' and toward its second position 'b'. Accordingly the normal position of the retaining member 24 is its second position 'b' so that unless acted on by another force or object, the retaining member 24 will preferably assume its second position 'b'. In one embodiment, the biasing member 34 includes a torsion spring 36 which biases the retaining member 24 away from its first position 'a', and a second torsion spring 38 which biases the retaining member away from its third position 'c' (see FIG. 1). The first and second torsion springs 36, 38 may be disposed on opposite ends of the retaining member 24 such as being disposed generally about oppositely extending and coaxially aligned shafts 30 about which the retaining member pivots. The retaining feature may include structures or apparatus other than springs, such as detent mechanism, or releasable latch that resists at least some force tending to move the retaining member out of its second position 'b' but may ultimately be overcome to permit the retaining member to move from its second position.

Figure 4:
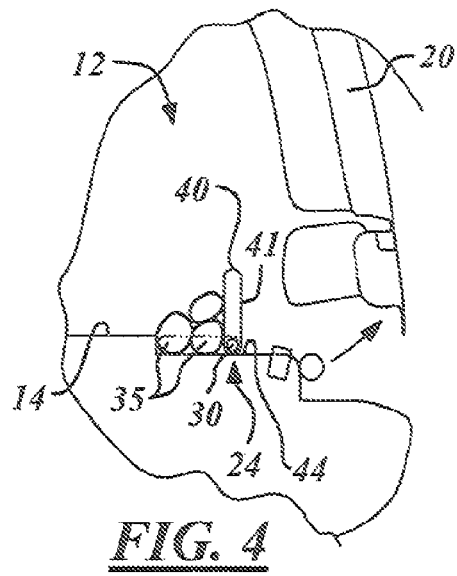
FIG. 4 is an enlarged fragmentary view like FIG. 3 showing some round cargo items being retained by the retaining device.
Figure 6:
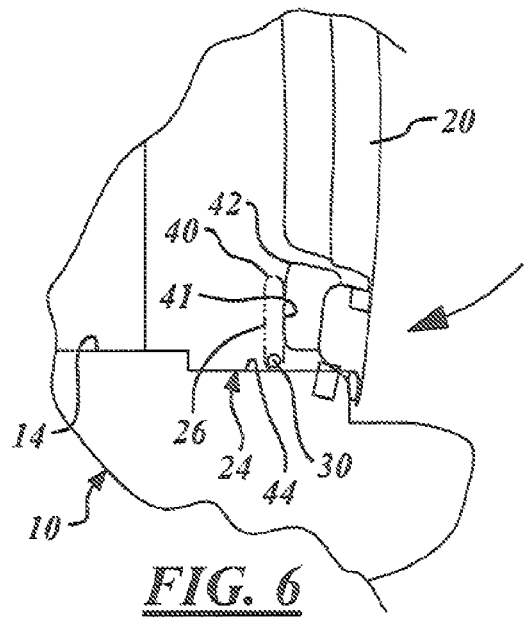
FIG. 6 is an enlarged fragmentary view of a portion of a vehicle cargo area with a vehicle door shown in its closed position.

As best shown in FIG. 3, when the liftgate 20 is in its closed position, a portion of the tailgate preferably engages the retaining member 24 and moves the retaining member 24 out of its second position 'b' and toward its first position 'a' against the force provided on the retaining member by the biasing member 36. Accordingly, the biasing member 36 provides a force urging the retaining member 24 against the liftgate 20 when the liftgate is closed. As the liftgate 20 is opened, the biasing member 36 maintains the retaining member 24 in contact with the liftgate until the liftgate is sufficiently open that the retaining member 24 assumes its second position 'b' under force of the biasing member. Accordingly, the retaining member 24 automatically moves to its second position 'b' as the liftgate 20 is opened to provide a barrier against objects 35 (see e.g. FIG. 4) falling out of the vehicle as the liftgate is initially opened. The retaining member 24 may be moved fully to its first position 'a' by the liftgate 20 when the liftgate is closed, and an outer edge 40 of the retaining member 24 may be generally flush with an inside surface 42 of the liftgate 20 so that objects in the cargo area 12 are not resting on or engaged with an outer surface 41 of the retaining member 24 when the liftgate 20 is closed. Of course, other constructions and arrangements are possible and contemplated herein. For example, as shown in FIG. 6, when the liftgate 20 is closed, it may not displace the retaining member 24 from its second position 'b' at all so that the retaining member 24 remains generally upright and adjacent the cargo area 12 even when the liftgate is closed. Or, the liftgate 20 may engage and move the retaining member 24 any desired angular amount from its second position 'b', including all the way to its first position 'a', as previously noted.

To limit intrusion of the retaining member 24 and prevent raising the threshold to the cargo area 12, the floor 14 may include a recess 44 in which the retaining member 24 is received when moved to its first position 'a', and/or its third position 'c', as desired. The recess 44 may be the same depth as the retaining member 24 is thick so that when in its first position 'a' the retaining member 24 is generally flush with the adjacent portion of the floor 14. Likewise, when folded into its third position 'c' the retaining member 24 may also be generally flush with the cargo area floor 14. If desired, a lock 50 (FIGS. 1 and 2) can be provided to releasably maintain the retaining member 24 in, for example, its first position 'a' wherein it may be generally flush with the cargo floor 14. The lock 50 may be a resilient finger with a catch that overlies a portion of the retaining member 24, or a spring-loaded lock which may be set by depressing the retaining member 24 against the spring and released by likewise pressing the retaining member 24 against the spring. The retaining member 24 may be releasably locked in its first position, for example, to facilitate loading cargo into the cargo area 12. Upon closing or opening the liftgate, the liftgate 20 may release the lock 50 so that when the liftgate 20 is subsequently opened, the retaining member 24 automatically is moved to its second position under force of the biasing member 36. Of course, the retaining member 24 could remain locked until the lock 50 is manually removed, if desired. The retaining member 24 may also be releasably connected to the vehicle 10 so that it may be removed from the vehicle if desired.

Accordingly, cargo which is loose and/or shifts during use of the vehicle, and which moves toward or leans against the liftgate 20 prior to opening the liftgate 20 can be effectively retained within the cargo area 12 upon opening the liftgate. The retaining member 24 preferably remains in its second position when the liftgate is closed or is automatically disposed in its second position 'b' upon opening of the liftgate. The retaining member preferably can be readily folded to the generally flat first or third positions, or any angle in between, to reduce interference to loading and unloading cargo from the cargo area 12. The retaining member 24 may also be releasably retained in any position, as desired. In one presently preferred embodiment, the actuation of the retaining member 24 to its second position to retain cargo, is accomplished independent of user interaction and preferably occurs automatically as the vehicle liftgate is opened.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A retainer for a cargo area that is bounded in part by a floor and a door movable between open and closed positions, the retainer comprising:

a retaining member spanning at least a portion of the cargo area;

a pivot feature operably associated with the retaining member and about which the retaining member pivots relative to the cargo area between a first position and a second position wherein the retaining member is inclined relative to the floor of the cargo area; and a retaining feature that yieldably moves the retaining member toward its second position to facilitate retaining cargo within the cargo area, when the door is moved toward its open position.

2. The retainer of claim 1 wherein the retaining member is a flat panel that spans a side of the cargo area adjacent the door and the retaining member is disposed adjacent to the floor of the cargo area.

3. The retainer of claim 1 wherein the retaining member is generally perpendicular to the floor when in its second position.

4. The retainer of claim 1 wherein the retaining member is generally parallel to the floor when in its first position.

5. The retainer of claim 4 wherein the retaining member is generally flush with the floor when in its first position.

6. The retainer of claim 1, which also comprises a locking feature, operably associated with the retaining member to selectively engage the retaining member and releasably maintain the retaining member in its first position.

7. The retainer of claim 1 wherein the retaining member is moved from its second position toward its first position by the door as the door is closed.

8. The retainer of claim 1 wherein the retaining feature includes a biasing member that yieldably urges the retaining member toward its second position.

9. The retainer of claim 8 wherein the biasing member includes a spring that yieldably biases the retaining member away from its first position and toward its second position.

10. The retainer of claim 1 wherein the retaining member is also movable to a third position generally diametrically opposed to the first position.

11. The retainer of claim 1 wherein the retaining member includes a spring that further yieldably biases the retaining member away from a third position and toward its second position.

12. The retainer of claim 1 wherein the pivot feature includes one or more coaxially aligned shafts that are received in pockets to permit rotation of the retaining member about an axis of the shafts.

* * * * *